United States Patent
Mochizuki et al.

(10) Patent No.: US 9,826,206 B2
(45) Date of Patent: Nov. 21, 2017

(54) DISPLAY CONTROL DEVICE, PROJECTION DEVICE, AND NON-TRANSITORY STORAGE MEDIUM

(71) Applicant: Panasonic Intellectual Property Management Co., Ltd., Osaka (JP)

(72) Inventors: Makoto Mochizuki, Kanagawa (JP); Koichi Emura, Kanagawa (JP); Tatsuru Daimon, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/277,985

(22) Filed: Sep. 27, 2016

(65) Prior Publication Data

US 2017/0104968 A1    Apr. 13, 2017

(30) Foreign Application Priority Data

Oct. 9, 2015  (JP) ................ 2015-201275

(51) Int. Cl.
*H04N 9/31* (2006.01)
*B60K 35/00* (2006.01)

(52) U.S. Cl.
CPC ......... *H04N 9/3182* (2013.01); *H04N 9/3155* (2013.01); *H04N 9/3194* (2013.01); *B60K 35/00* (2013.01); *B60K 2350/203* (2013.01); *B60K 2350/2008* (2013.01); *B60K 2350/2052* (2013.01); *B60K 2350/2069* (2013.01)

(58) Field of Classification Search
CPC .. H04N 9/3182; H04N 9/3155; H04N 9/3194; B60K 35/00; B60K 2350/2008; B60K 2350/203; B60K 2350/2052; B60K 2350/2069
See application file for complete search history.

(56) References Cited

U.S. PATENT DOCUMENTS

| | | | |
|---|---|---|---|
| 2002/0024529 A1* | 2/2002 | Miller | G09G 5/10 345/690 |
| 2011/0035099 A1 | 2/2011 | Kobayashi | |
| 2011/0175925 A1* | 7/2011 | Kane | G01J 1/42 345/589 |
| 2011/0228985 A1* | 9/2011 | Uchida | G06T 7/215 382/103 |
| 2012/0050307 A1 | 3/2012 | Mahowald et al. | |

FOREIGN PATENT DOCUMENTS

EP    2557557 A1    2/2013
JP    2015-123761   7/2015

OTHER PUBLICATIONS

The Extended European Search Report dated May 19, 2017 for the related European Patent Application No. 16192173.9.

* cited by examiner

*Primary Examiner* — Michael Teitelbaum
(74) *Attorney, Agent, or Firm* — Greenblum & Bernstein, P.L.C.

(57) ABSTRACT

A display control device includes: an input unit that receives environmental information on a vehicle; and a controller that outputs to an image generator a first control signal for generating a first specific image representing a presentation image to be displayed on a display medium. When decreasing the luminance of the presentation image based on the environmental information, the controller outputs to the image generator a second control signal for generating a second specific image representing the presentation image with a hue changed to decrease a blue component in a display color.

9 Claims, 16 Drawing Sheets

FIG. 4

| LUMINANCE OF DISPLAY MEDIUM | HUE CHANGE AMOUNT |
|---|---|
| 1 (DARK) | 5 |
| 2 | 3 |
| 3 | 1 |
| 4 | DEFAULT SETTING |
| 5 (LIGHT) | DEFAULT SETTING |

DISPLAY CONTROL DEVICE, PROJECTION DEVICE, AND NON-TRANSITORY STORAGE MEDIUM

BACKGROUND

1. Technical Field

The present disclosure relates to a display control device that controls displaying of an image provided to an occupant of a moving object, a projection device, and a non-transitory storage medium.

2. Description of the Related Art

Conventionally, a technique (see Japanese Unexamined Patent Application Publication No. 2015-123761, for example) has been known for detecting brightness around a vehicle (an example of a moving object) by using an illuminance sensor mounted in the vehicle, and deciding a display color of a displayed image depending on the detected condition of the brightness. When the brightness around the vehicle is bright, the technique assumes that a front view of the vehicle has a bright color in a warm hue, and selects a color in a cool hue, which is a complementary color of the warm hue, for the display color. On the other hand, when the brightness around the vehicle is dark, the technique assumes that the front view of the vehicle has a dark color in a cool hue, and selects a warm hue, which is a complementary color of the cool hue, for the display color.

SUMMARY

However, the technique disclosed in Japanese Unexamined Patent Application Publication No. 2015-123761 was made without considering a case of controlling a luminance of the image depending on the brightness around the vehicle. Therefore, there is still a room for improving a visibility of the image.

One non-limiting and exemplary embodiment provides a display control device that can reduce deterioration of a visibility of an image caused by decrease of the luminance of the image, a projection device, and a non-transitory storage medium.

In one general aspect, the techniques disclosed here feature a display control device according to an aspect of the present disclosure including: an input receiver that receives environmental information on a moving object; and a controller that outputs to an image generator a first control signal for generating a first specific image representing a presentation image to be displayed on a display medium. When decreasing the luminance of the presentation image based on the environmental information, the controller outputs to the image generator a second control signal for generating a second specific image representing the presentation image with a hue changed to decrease a blue component in a display color.

According to the present disclosure, an operator of an apparatus can be determined with a high accuracy.

According to the present disclosure, the visibility of the image can be improved without giving a wrong impression to an occupant.

It should be noted that such inclusive or specific aspects may be provided with a system, a method, an integrated circuit, a computer program, a storage medium, or an arbitrary combination of these.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram showing a table according to a first modification of the first embodiment of the present disclosure;

DETAILED DESCRIPTION (Underlying Knowledge Forming Basis of the Present Disclosure)

In the technology disclosed in Japanese Unexamined Patent Application Publication No. 2015-123761, the visibility of an image may be deteriorated because of a hue change accompanying a change in the luminance of the image according to the brightness around a vehicle or an operation by a user for a purpose of reducing an annoyance of the displayed image. The visibility of the image may be deteriorated particularly when the luminance of the image displayed with a cool hue containing a blue component in plenty decreases.

(First Embodiment)

A first embodiment of the present disclosure will be described with reference to FIGS. 1 to 11.

Figure 1:
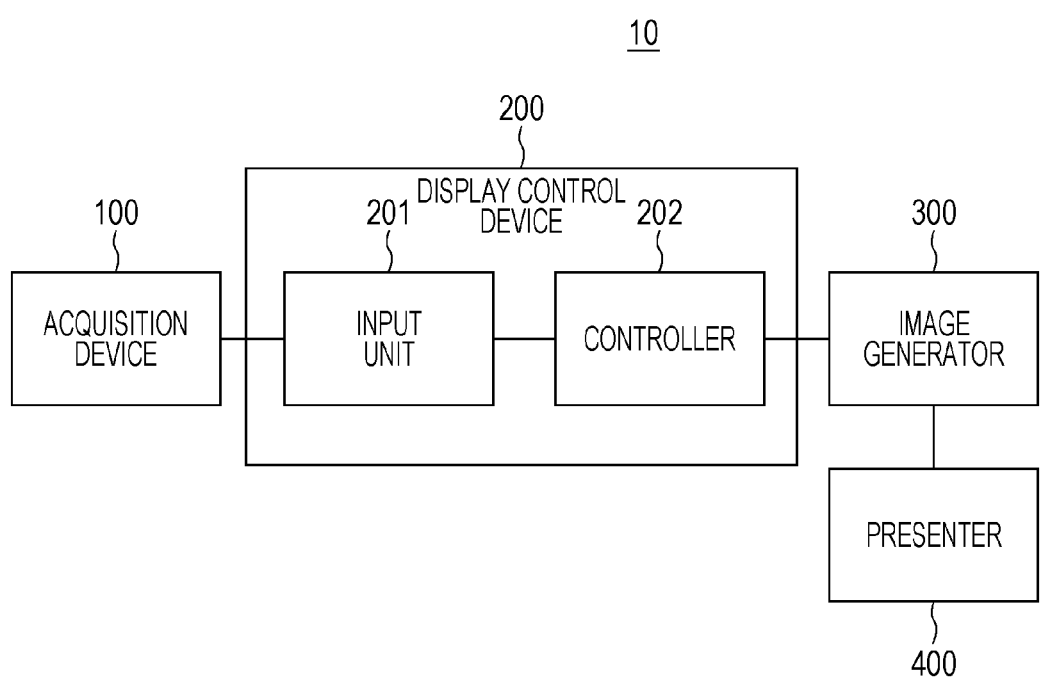
FIG. 1 is a block diagram showing a configuration example of a display system according to a first embodiment of the present disclosure.

First, a configuration example of a display system 10 according to the embodiment will be described with reference to FIG. 1. FIG. 1 is a block diagram showing the configuration example of the display system 10 according to the embodiment.

The display system 10 is used in a moving object such as a vehicle, for example. Specifically, the display system 10 may either be an in-vehicle apparatus or an apparatus brought into the vehicle. Note that although the embodiment will be described with an example of a case where the display system 10 is applied to the vehicle, the moving object is not limited to the vehicle and may be a vessel, an aircraft, or the like. In addition, although the embodiment will be described with an example of a case where the user is an occupant (a driver or a passenger, for example) of the vehicle, it is not limited thereto.

In FIG. 1, the display system 10 includes an acquisition device 100, a display control device 200, an image generator 300, and a presenter (projection unit) 400. Note that, a configuration in which the image generator 300 is included in the display control device 200 may be referred to as a "projection device". The projection device may also include the presenter 400.

Constituents of the display system 10 will be described below.

First, the acquisition device 100 will be described.

The acquisition device 100 is a device that acquires environmental information of the vehicle. The acquisition device 100 is an illuminance sensor (an example of a first sensor) provided to the inside the vehicle and configured to measure an illuminance, for example. The environmental information is information indicating the illuminance measured by the illuminance sensor, for example. The illuminance measured by the illuminance sensor is an illuminance inside the vehicle cabin (hereinafter, referred to as an in-vehicle illuminance), for example.

The acquisition device 100 outputs the acquired environmental information to an input unit 201 of the display control device 200. Note that the acquisition device 100 may either output the environmental information all the time or only when the environment (in-vehicle illuminance, for example) is changed.

So far, the acquisition device 100 has been described.

Next, the display control device 200 will be described.

As shown in FIG. 1, the display control device 200 includes the input unit 201 and a controller 202.

The input unit 201 receives the environmental information from the acquisition device 100 and outputs the environmental information to the controller 202.

Note that the input unit 201 may either be a part such as a connecter or an input terminal, or a functional unit implemented by a program on software. A connection between the input unit 201 and the acquisition device 100 may either be wired or wireless.

The controller 202 outputs to the image generator 300 an image control signal, based on which the image generator 300 generates a specific image representing a presentation image in a display on a display medium (not illustrated).

Here, the image control signal is a signal for controlling the image generator 300. For example, the image control signal includes information on the presentation image to be displayed and information on setting contents of the presentation image (a hue of the display color, size, shape, and a display position, for example).

The presentation image is an image visible to the occupant of the vehicle in displaying on the display medium. The presentation image is, for example, an image that indicates a speed of the vehicle, a remaining amount of a fuel of the vehicle, a traveling distance of the vehicle, a current position of the vehicle, a distance from the current position to a destination, and so on. Additionally, the presentation image may be, for example, an image that indicates a state of the driver (sleepiness level, for example), the name of a radio station or a TV program that the occupant is listening to or watching in the vehicle, a content that is being played in the vehicle (the name of an artist or the title of a music number), a receiving state of a message of a service such as an e-mail or a social networking service (SNS) in the vehicle, and so on. Moreover, the presentation image may be, for example, an image that indicates weather, a current traffic jam, a current accident, a current regulation, a vacancy of a parking space, a speed limit of each road section or a route, the type or name of an object (for example, another vehicle, a pedestrian, a facility, a building, a traffic light, a road sign, and so on) around the vehicle, a distance between the vehicle and the object, a positional relation between the vehicle and the object, and so on.

The image control signal includes the following first image control signal and second image control signal.

The first image control signal is a control signal, based on which the image generator 300 generates a specific image (an example of a first specific image) representing a presentation image with a default display color in displaying on the display medium. For example, when starting to display the predetermined presentation image, the controller 202 outputs the first image control signal to the image generator 300. Otherwise, for example, while the predetermined presentation image is displayed, the controller 202 outputs the first image control signal to the image generator 300 when the luminance of the presentation image need not be decreased from the default luminance based on the environmental information received from the input unit 201, and when the blue component in the display color of the presentation image is less than that in the default hue. That is, when the blue component in the display color of the presentation image is already less than that of the default hue, and when it becomes unnecessary to decrease the luminance of the presentation image from the default luminance based on the environmental information received from the input unit 201, the controller 202 outputs the first image control signal to the image generator 300.

The second image control signal is a control signal, based on which the image generator 300 generates a specific image (an example of a second specific image) representing a presentation image changed such that the blue component in the display color of the presentation image is decreased from that in the default hue. For example, when the luminance of the presentation image need be decreased from the default luminance based on the environmental information received from the input unit 201 while the predetermined presentation image is displayed, the controller 202 outputs the second image control signal to the image generator 300.

Additionally, the controller 202 outputs to the display medium a luminance control signal that changes the luminance of the presentation image on the display medium (hereinafter, simply referred to as a luminance of the display medium).

Here, the luminance control signal is a signal for controlling the luminance of the display medium and, for example, includes information such as a luminance value.

The luminance control signal includes the following luminance decreasing control signal and luminance increasing control signal.

The luminance decreasing control signal is a control signal that decreases the luminance of the display medium from the default luminance. For example, when the luminance of the presentation image need be decreased from the default luminance based on the environmental information received from the input unit 201 while the predetermined presentation image is displayed, the controller 202 outputs the luminance decreasing control signal to the display medium.

The luminance increasing control signal is a control signal that increases the luminance of the display medium that is decreased by a control based on the luminance decreasing control signal. For example, while the predetermined presentation image is displayed, the controller 202 outputs the luminance increasing control signal to the display medium when the luminance of the presentation image need not be decreased from the default luminance based on the environmental information received from the input unit 201.

Note that the controller 202 also performs various processing other than the above-mentioned output processing of the image control signals and the luminance control signals. The details of the other processing will be described later with reference to FIG. 2.

So far, the display control device 200 has been described.

Next, the image generator 300 will be described.

The image generator 300 generates the specific image based on the first or second image control signal received from the controller 202 and outputs the generated specific image to the presenter 400.

Here, the specific image may either be an image representing the presentation image in the display on the display medium or image data representing the presentation image in the display on the display medium. The image generator 300 generates the image, for example, in the case where the display system 10 is a head-up display (HUD) system and the presenter 400 has a projecting function. On the other hand, the image generator 300 generates the image data, for example, in the case where the display system 10 is a transmissive display system and the presenter 400 has no projecting function.

So far, the image generator 300 has been described.

Next, the presenter 400 will be described.

The presenter 400 outputs the specific image generated by the image generator 300 to the display medium. As a result, the presentation image is displayed on the display medium and becomes visible to the occupant of the vehicle.

For example, when the display system 10 is the head-up display (HUD) system, the presenter 400 has the projecting function and thereby directly projects the image generated by the image generator 300 to a display (an example of the display medium). As a result, the occupant of the vehicle can view a virtual image of the presentation image. The presentation image may be projected on the display in such a way as to be superimposed on the field of view of the occupant. Incidentally, a description of a principle that enables the occupant to view the virtual image of the presentation image projected on the display is omitted herein since the technique is publicly known.

The display may be, for example, a liquid crystal display (LCD), a head-up display (HUD), a head-mounted display or a helmet-mounted display (HMD), smart glasses, a navigation display, a meter display, another dedicated display, and so on. The HUD may either be a windshield of the vehicle or a transparent glass or plastic plate additionally attached (a combiner 801 shown in FIG. 11, for example). The windshield may be any of a front window, side windows, or a rear window of the vehicle.

Additionally, the presenter 400 may have a function of projecting the image generated by a digital mirror micro electro mechanical systems (MEMS) device (an example of the image generator 300) to a lens. The image drawn by the MEMS device is an image which is projected onto a space and is not directly visible to the occupant of the vehicle. In this case, the presenter 400 serves as a lens on which the image drawn by the MEMS device is projected. The virtual image of the presentation image projected via the lens can be viewed by the occupant of the vehicle. Note that the presenter 400 may include a reflective mirror in addition to the lens.

Otherwise, for example, when the display system 10 is the transmissive display system, the presenter 400 outputs the image data generated by the image generator 300 to a transmissive display (an example of the display medium) that transmits light. As a result, the occupant of the vehicle can concurrently view a background and the presentation image on the transmissive display. Incidentally, a description of a principle that enables the image data inputted to the transmissive display to be displayed as the presentation image is omitted herein since the technique is publicly known.

The transmissive display may either be a transmissive organic light emitting display or a transparent display made of a glass that emits light when irradiated by light with a specific wavelength.

Note that the display medium may be a hologram. A usable method with the hologram is one using a light guiding panel that totally internally reflects parallel rays that meet total internal reflection conditions of the light guiding panel, and thereby guides the parallel rays. In this method, a part of the parallel rays guided by the internal total reflection of the light guiding panel is projected such that the virtual image may be viewed by the occupant. Incidentally, unlike a projector, the method using the light guiding panel does not directly project the image data. However, the method is described using the definition, projecting, as in the projector method for convenience of description.

The specific image and the presentation image are ideally the same.

They are substantially the same even differing in some degree depending on conditions such as a degree of curvature of the display medium. The specific image is generated by the image generator 300, and the presentation image is displayed on the display medium.

So far, the presenter 400 has been described.

Incidentally, the display system 10 may include the display medium (any of the above-mentioned displays, for example).

The above-mentioned specific image (the image or the image data) may be generated by the display control device 200 or another unillustrated constituent, instead of the image generator 300, and outputted to the presenter 400.

So far, the constituents of the display system 10 have been described with reference to FIG. 1.

Figure 2:
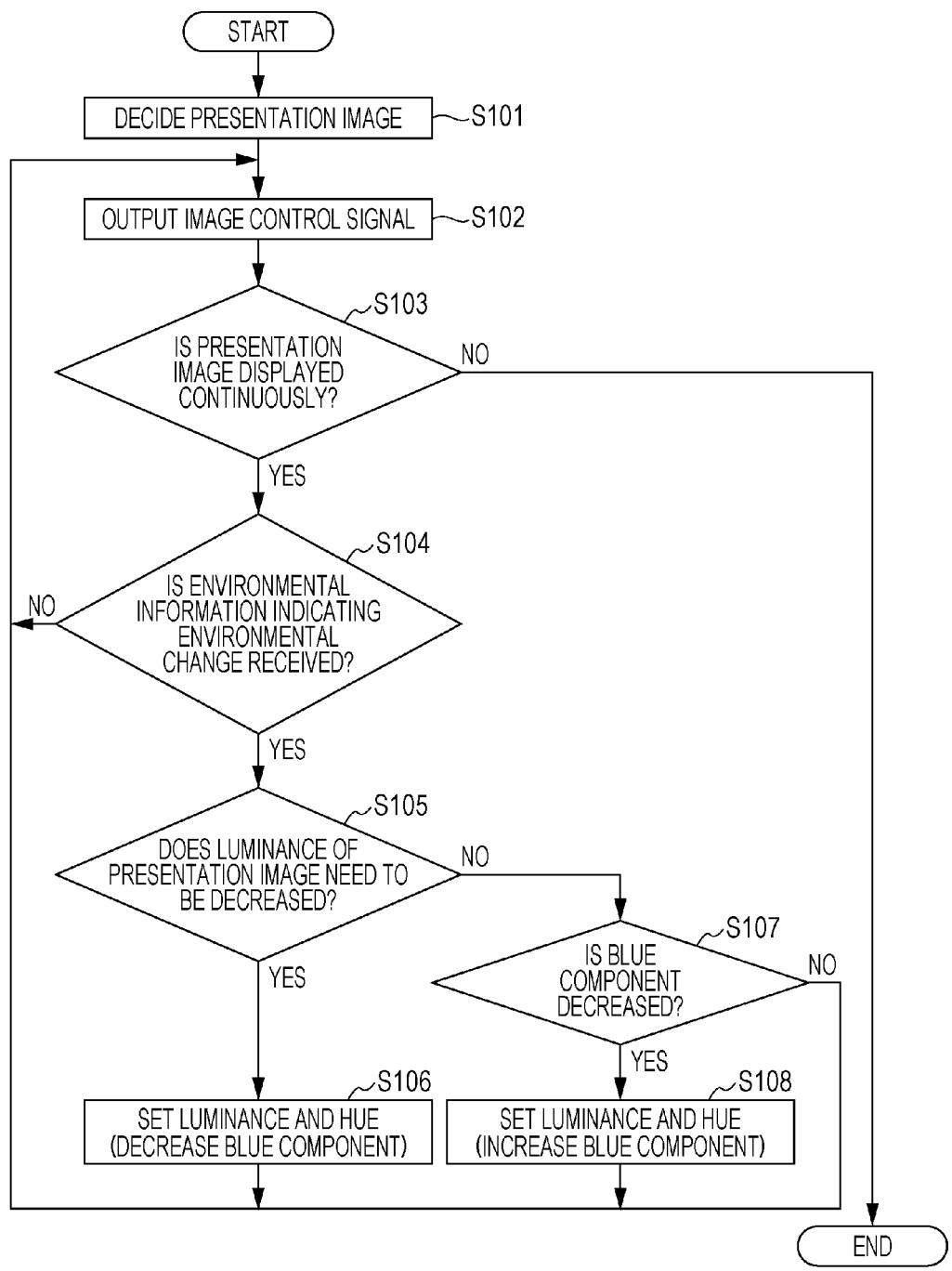
FIG. 2 is a flowchart showing an operation example of a display control device according to the first embodiment of the present disclosure.

Next, an operation example of the display control device 200 will be described with reference to FIG. 2. FIG. 2 is a flowchart showing the operation example of the display control device 200.

In step S101, the controller 202 decides the presentation image that is started to be displayed. The presentation image decided in this step is under default setting of the hue, the size, the shape, the display position, and the like.

In step S102, the controller 202 outputs the image control signal to the image generator 300. For example, the controller 202 outputs the first image control signal to the image generator 300 when starting to display the predetermined presentation image. The first image control signal includes information on the decided presentation image and the default setting contents (such as the hue, the size, the shape, and the display position, for example) of the presentation image.

The image generator 300 having received the first image control signal generates the specific image (hereinafter, referred to as the first specific image) representing the presentation image based on the first image control signal and outputs the first specific image to the presenter 400. The presenter 400 outputs the first specific image generated by the image generator 300 to the display medium. As a result, the presentation image is displayed on the display medium with the default hue and thereby is viewed by the occupant of the vehicle.

Incidentally, processing in step S102 in a case other than the case where the predetermined presentation image is started to be displayed will be described later.

In step S103, the controller 202 determines whether or not the presentation image is displayed continuously. For example, the controller 202 determines that the presentation image is continuously displayed if the controller 202 previously outputs either of the first or second image control signal to the image generator 300. On the other hand, for example, the controller 202 determines that the presentation image is not displayed anymore if the controller 202 previously outputs a display termination control signal to the image generator 300 to stop displaying the presentation image during the presentation image is displayed.

If the controller 202 determines that the presentation image is not displayed anymore (step S103: NO), the flow proceeds to the end. On the other hand, if the controller 202 determines that the presentation image is displayed continuously (step S103: YES), the flow proceeds to step S104.

In step S104, the controller 202 determines whether or not the controller 202 receives the environmental information indicating an environmental change from the input unit 201. Here, the environmental information is information indicating the in-vehicle illuminance, for example, and the environmental change is decrease or increase of the in-vehicle illuminance.

If the controller 202 determines that the controller 202 receives no environmental information indicating an environmental change (step S104: NO), the flow returns to step S102. Then, in step S102, the controller 202 outputs an image control signal of the same type as the image control signal outputted at the previous time to the image generator 300. For example, if the first image control signal is outputted at the previous time, the controller 202 outputs the first image control signal. If the second image control signal is outputted at the previous time, the controller 202 outputs the second image control signal.

If the controller 202 determines that the controller 202 receives the environmental information indicating the environmental change (step S104: YES), the flow proceeds to step S105.

In step S105, the controller 202 determines whether or not the luminance of the presentation image need be decreased from the default luminance based on the environmental information. For example, if the in-vehicle illuminance is equal to or lower than a predetermined threshold (an example of a first threshold), the controller 202 determines that the luminance of the presentation image need be decreased from the default luminance. On the other hand, for example, if the in-vehicle illuminance is higher than the predetermined threshold, the controller 202 determines that the luminance of the presentation image need not be decreased from the default luminance.

If the controller 202 determines that the luminance of the presentation image need be decreased from the default luminance (step S105: YES), the flow proceeds to step S106. On the other hand, if the controller 202 determines that the luminance of the presentation image need not be decreased from the default luminance (step S105: NO), the flow proceeds to step S107.

In step S106, the controller 202 sets the luminance and the hue of the presentation image. For example, the controller 202 sets the luminance value to change such that luminance of a backlight of the display medium is decreased from the default luminance. Additionally, for example, the controller 202 sets the hue to change such that the blue component in the display color of the presentation image is decreased from that in the default hue.

Figure 3:
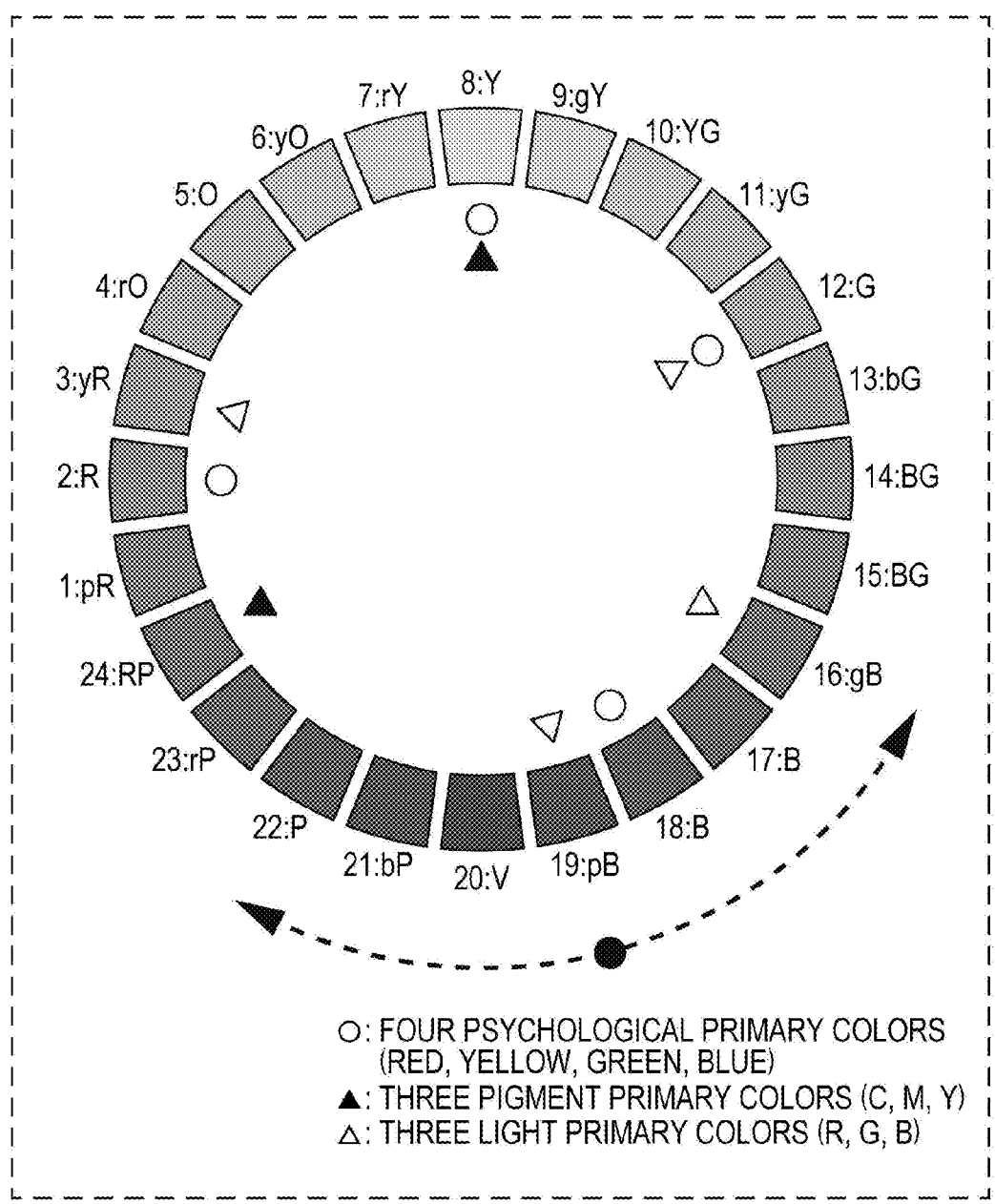
FIG. 3 is a diagram showing an example of a color wheel according to the first embodiment of the present disclosure.

Here, a specific example of the setting to change the hue will be described with reference to FIG. 3. FIG. 3 is a diagram showing an example of a color wheel used for the setting to change the hue.

The color wheel shown in FIG. 3 is a color wheel of a practical color co-ordinate system (PCCS) (see http://www.sikiken.co.jp/pccs/pccs02.html). First, the controller 202 reads information on the color wheel shown in FIG. 3 from a predetermined storage (not illustrated). Here, for example, assume that the default hue of the presentation image is blue (19 in FIG. 3). Then, the controller 202 decides that a new hue is a predetermined hue (green (12 in FIG. 3), for example) at a position moved in the color wheel shown in FIG. 3 relative to the position of blue (18) in a direction in which the blue component decreases (a counterclockwise direction indicated by an arrow in FIG. 3). Although green is used as an example of the hue with the blue component decreased from that of blue in the description, any other color may be used instead.

Note that the color wheel used for the setting to change the hue is not limited to the 24-color wheel shown in FIG. 3 but may be another color wheel.

So far, the specific example of the setting to change the hue has been described. Hereinafter, the description returns to the flow in FIG. 2.

After the processing in step S106, the flow returns to step S102. In step S102, the controller 202 outputs the second image control signal to the image generator 300. This second image control signal includes information indicating at least the new hue (the hue with the blue component decreased from that of the default hue). Note that the second image control signal may include information on the shape, the size, the display position and the like of the presentation image. In addition, in step S102, the controller 202 outputs the luminance decreasing control signal to the display medium. The luminance decreasing control signal includes information indicating the new luminance value.

The display medium having received the luminance decreasing control signal decreases the luminance from the default luminance by a control based on the luminance decreasing control signal. Additionally, the image generator 300 having received the second image control signal generates a specific image (hereinafter, referred to as a second specific image) based on the second image control signal and outputs the second specific image to the presenter 400. The presenter 400 outputs the second specific image generated by the image generator 300 to the display medium. As a result, the presentation image is displayed with the new hue (the hue with the blue component decreased from that of the default hue) on the display medium, and is viewed by the occupant of the vehicle.

In step S107, the controller 202 determines whether or not the blue component is decreased in the hue of the presentation image continuously displayed on the display medium. In other words, the controller 202 determines whether or not the controller 202 outputs the second image control signal to the image generator 300 at the previous time.

If the controller 202 determines that the blue component is not decreased (step S107: NO), the flow returns to step S102. Then, in step S102, the controller 202 outputs the first image control signal again to the image generator 300 as in the previous output.

On the other hand, if the controller 202 determines that the blue component is decreased (step S107: YES), the flow proceeds to step S108.

In step S108, the controller 202 sets the luminance and the hue of the presentation image. For example, the controller 202 sets the luminance value to change such that the luminance of the backlight of the display medium increases from the current luminance. In other words, the controller 202 restores the luminance value of the backlight decreased by the luminance decreasing control signal. Additionally, for example, the controller 202 sets the hue to change such that the blue component in the display color of the presentation image increases from that in the current hue. In other words, the controller 202 restores the blue component decreased by the second image control signal. For example, if the hue of the presentation image set based on the second image control signal is green (12 in FIG. 3), the controller 202 sets the hue of the presentation image to be blue (19 in FIG. 3) that is the default hue.

After the processing in step S108, the flow returns to step S102. In step S102, the controller 202 outputs the first image control signal to the image generator 300. This first image control signal includes the information indicating at least the new hue (the default hue, for example). Note that the first image control signal may include the information on the shape, the size, the display position and the like of the presentation image. In addition, in step S102, the controller 202 outputs the luminance increasing control signal to the display medium. The luminance increasing control signal includes information indicating a new luminance value (the default luminance value, for example).

In the display medium having received the luminance increasing control signal, the luminance decreased by the control based on the luminance decreasing control signal is increased by a control based on the luminance increasing control signal. Additionally, the image generator 300 having received the first image control signal generates the first specific image based on the first image control signal and outputs the first specific image to the presenter 400. The presenter 400 outputs the first specific image generated by the image generator 300 to the display medium. As a result, the presentation image is displayed with a new hue (the default hue, for example) on the display medium, and is viewed by the occupant of the vehicle.

So far, the operation example of the display control device 200 has been described.

As described above, the display control device 200 in the embodiment includes: the input unit 201 that receives the environmental information of the vehicle from the acquisition device 100 acquiring the environmental information of the vehicle; and the controller 202 that outputs to the image generator 300 the first control signal for generating the first specific image representing the presentation image in the display on the display medium. When decreasing the luminance of the presentation image based on the environmental information, the controller 202 outputs to the image generator 300 the second control signal for generating the second specific image representing the presentation image with the hue changed to decrease the blue component in the display color. As a result, deterioration of a visibility of the presentation image because of the decrease in the luminance of the presentation image can be reduced.

So far, the first embodiment of the present disclosure has been described. However, the present disclosure is not limited to the above first embodiment and can be modified in various ways. The modifications are described below.

(First Modification)

In the first embodiment, when setting the hue with the decreased blue component, the controller 202 may set the hue depending on the luminance of the display medium. A specific example of this case will be described with reference to FIG. 4. FIG. 4 is a diagram showing an example of a table used for setting the hue.

In the table shown in FIG. 4, the luminance of the display medium and a hue change amount are registered in association with each other. Note that "default setting" shown in FIG. 4 means that, for example, the hue change amount is zero. The table in FIG. 4 is stored in the predetermined storage, for example.

First, for example, when setting the hue with the decreased blue component in the processing in step S106 in FIG. 2, the controller 202 reads the table in FIG. 4 and the information on the color wheel in FIG. 3 from the predetermined storage. Next, the controller 202 decides the hue change amount corresponding to the currently-set luminance of the display medium (for example, assuming that the luminance is already known to the controller 202). Then, the controller 202 decides that the new hue of the presentation image is a hue at a position moved in the color wheel shown in FIG. 3 relative to a position of the current hue of the presentation image (the default hue, for example) by the decided hue change amount in a direction in which the blue component decreases (the counterclockwise direction indicated by the arrow in FIG. 3).

For example, if the currently-set luminance of the display medium is 2 and the current hue of the presentation image is blue (19 in FIG. 3), the controller 202 decides that a new hue of the presentation image is blue (16 in FIG. 3). Then, the controller 202 outputs the second image control signal including the information on the decision result to the image generator 300.

According to the modification, the change amount of the blue component in the hue of the presentation image can be adjusted depending on the luminance of the presentation image. Therefore, the visibility of the presentation image can be further improved.

(Second Modification)

The first embodiment has been described with the example of the case where the information indicating the in-vehicle illuminance is used as the example of the environmental information. However, in addition to the in-vehicle illuminance, illuminance in front of the vehicle (hereinafter, referred to as front illuminance) may also be used as an example of the environmental information. A specific example of this case will be described below.

A configuration of the modification is identical to the configuration shown in FIG. 1, except that the acquisition device 100 is provided inside the vehicle and includes the illuminance sensor (the example of the first sensor) that measures the in-vehicle illuminance and an illuminance sensor (an example of a second sensor) that recognizes the front illuminance. Thus, in the modification, the acquisition device 100 outputs the information indicating the in-vehicle illuminance and the information indicating the front illuminance to the input unit 201. Then, the input unit 201 outputs the information indicating the in-vehicle illuminance and the information indicating the front illuminance as the environmental information to the controller 202.

Figure 5:
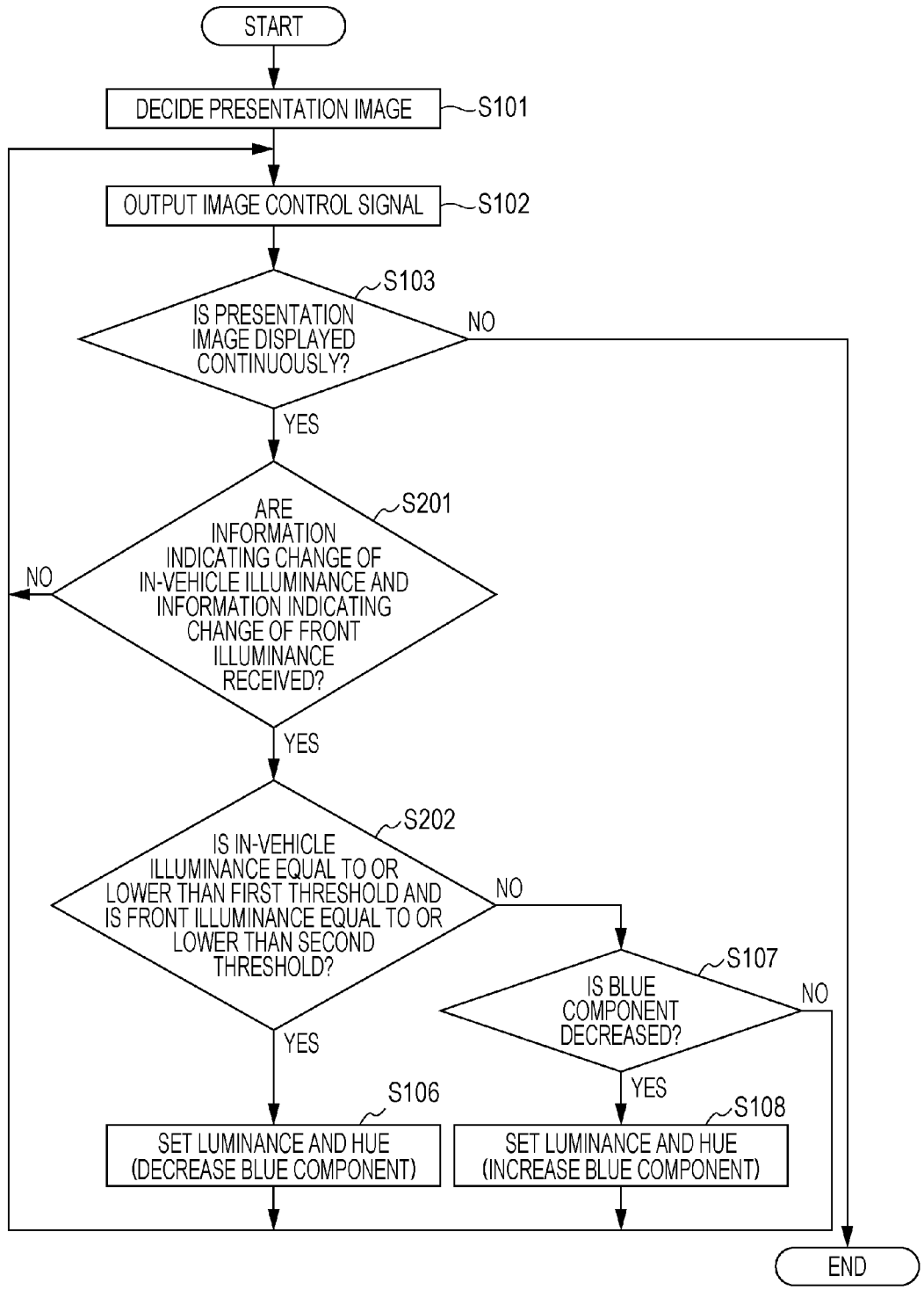
FIG. 5 is a flowchart showing an operation example of a display control device according to a second modification of the first embodiment of the present disclosure.

An operation example of the display control device 200 according to the modification will be described below with reference to FIG. 5. FIG. 5 is a flowchart showing the operation example of the display control device 200 according to the modification. Note that, the processing same with that in FIG. 2 is indicated by the same reference numeral in FIG. 5, and a duplicated description is omitted herein.

In step S201, the controller 202 determines whether or not the controller 202 receives the information indicating a change (decrease or increase) of the in-vehicle illuminance and the information indicating a change (decrease or increase) of the front illuminance from the input unit 201.

If the controller 202 determines that the controller 202 receives no information indicating a change of the in-vehicle illuminance and no information indicating a change of the front illuminance (step S201: NO), the flow returns to step S102. On the other hand, if the controller 202 determines that the controller 202 receives the information indicating the change of the in-vehicle illuminance and the information indicating the change of the front illuminance (step S201: YES), the flow proceeds to step S202.

In step S202, the controller 202 determines whether or not the luminance of the presentation image need be decreased from the default luminance based on the environmental information. For example, the controller 202 determines whether or not the in-vehicle illuminance is equal to or lower than the predetermined first threshold and whether the front illuminance is equal to or lower than a predetermined second threshold (a value different from the first threshold).

If the controller 202 determines that the in-vehicle illuminance is higher than the first threshold or the front illuminance is higher than the second threshold (step S202: NO), the flow proceeds to step S107. On the other hand, if the controller 202 determines that the in-vehicle illuminance is equal to or lower than the first threshold and the front illuminance is equal to or lower than the second threshold (step S202: YES), the flow proceeds to step S106.

Note that the illuminance sensor, which recognizes the front illuminance, described in the modification may be an image sensor that captures an image of a view in front of the vehicle and recognizes the front illuminance based on the captured image, for example.

When the in-vehicle illuminance is dark and the front view such as a front road surface area has a bright front illuminance, the in-vehicle illuminance recovers soon while the vehicle is travelling. In such a case, if the luminance and the hue of the presentation image are controlled only based on the in-vehicle illuminance, the displaying of the presentation image is switched in a short time. Such a quick switching may visually annoy the occupant of the vehicle. According to the modification, only when both the in-vehicle illuminance and the front illuminance are decreased, the luminance and the blue component in the hue of the presentation image can be decreased. This may prevent the displaying of the presentation image from visually annoying the occupant of the vehicle.

(Third Modification)

In addition to the information indicating the in-vehicle illuminance, information on a gaze direction of the occupant of the vehicle may further be used in the first embodiment. A specific example of this case will be described below.

Figure 6:
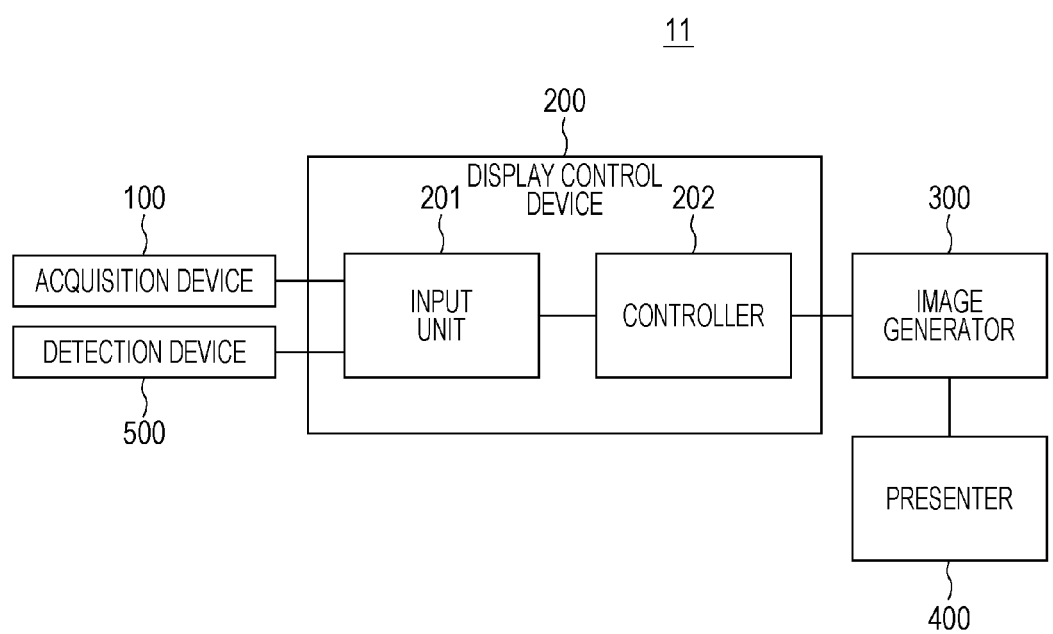
FIG. 6 is a diagram showing a configuration example of a display system according to a third modification of the first embodiment of the present disclosure.

First, a configuration example of a display system 11 according to the modification will be described with reference to FIG. 6. FIG. 6 is a block diagram showing the configuration example of the display system 11 according to the modification. Note that the constituent same with that in FIG. 1 is indicated by the same reference numeral in FIG. 6, and a duplicated description is omitted herein.

As shown in FIG. 6, the display system 11 further includes a detection device 500 in addition to the configuration shown in FIG. 1.

The detection device 500 is a driver monitor, which detects the gaze direction of the occupant of the vehicle and outputs the information indicating a direction of the detected gaze direction (hereinafter, referred to as gaze direction information) to the input unit 201, for example.

Additionally, the acquisition device 100 is an illuminance sensor (an example of the first sensor) provided inside the vehicle to measure the in-vehicle illuminance, and outputs the information indicating the in-vehicle illuminance as the environmental information to the input unit 201.

The input unit 201 outputs the gaze direction information received from the detection device 500 and the information indicating the in-vehicle illuminance received from the acquisition device 100 to the controller 202.

The controller 202 determines whether or not the luminance of the presentation image need be decreased based on the gaze direction information and the information indicating the in-vehicle illuminance received from the input unit 201. The details of the determination processing will be described with reference to FIG. 7.

Figure 7:
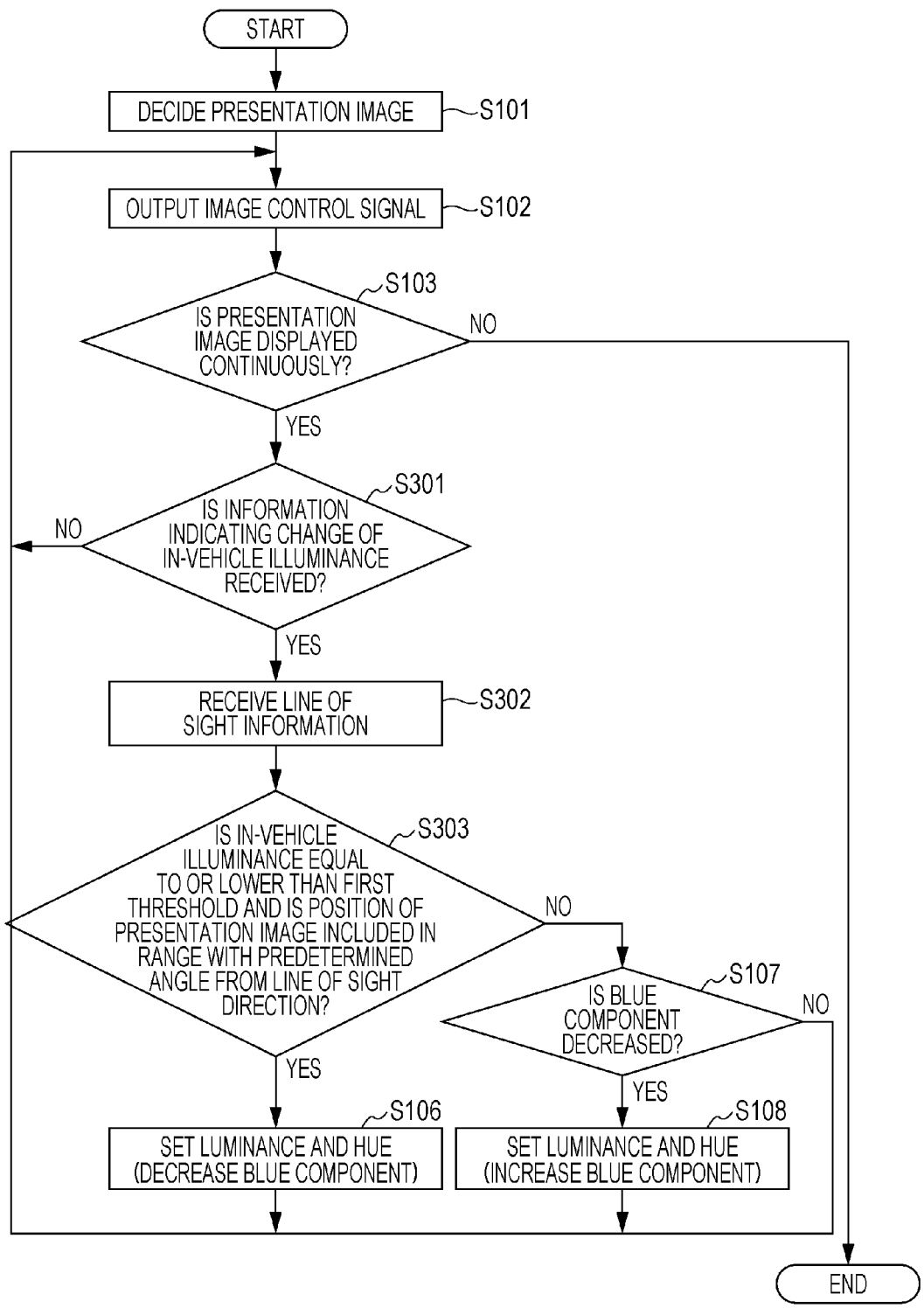
FIG. 7 is a flowchart showing an operation example of a display control device according to the third modification of the first embodiment of the present disclosure.

Next, an operation example of the display control device 200 according to the modification will be described with reference to FIG. 7. FIG. 7 is a flowchart showing the operation example of the display control device 200 according to the modification. Note that, the processing same with that in FIG. 2 is indicated by the same reference numeral in FIG. 7, and a duplicated description is omitted herein.

In step S301, the controller 202 determines whether or not the controller 202 receives the information indicating a change (decrease or increase) of the in-vehicle illuminance from the input unit 201.

If the controller 202 determines that the controller 202 receives no information indicating the change of the in-vehicle illuminance (step S301: NO), the flow returns to step S102. On the other hand, if the controller 202 determines that the controller 202 receives the information indicating the change of the in-vehicle illuminance (step S301: YES), the flow proceeds to step S302.

In step S302, the input unit 201 receives the gaze direction information from the detection device 500 and outputs the gaze direction information to the controller 202.

In step S303, the controller 202 determines whether or not the luminance of the presentation image need be decreased from the default luminance based on the environmental information. For example, the controller 202 determines whether or not the in-vehicle illuminance is equal to or lower than the predetermined first threshold and the position of the presentation image is within a predetermined angular range from the gaze direction indicated by the gaze direction information.

Here, the predetermined angular range is a range of a central visual field, for example. The central visual field is defined, for example, as about 2 degrees of visual angle (a range with a radius of 1 degree from a fovea centrails) in terms of a resolving vision (see L. L. Sloan, "The photopic acuity-luminance function with special reference to parafoveal vision", Vision Research, 1968, pp. 901-911, for example), a range with 5 degrees of visual angle in terms of a retinal structure (see M. Mishkin, L. Ungerleider, "Contribution of striate inputs to the visuospatial functions of parieto-preoccipital cortex in monkeys", Behav Brain Res, 1982, pp. 57-77, for example), or a range with 7 degrees of visual angle in classification of the neuroanatomy related to the visual cortex (see "Vision Information Handbook" edited by Vision Society of Japan, Asakura Shoten, 2000, for example). Note that the definitions of the central visual field are not limited to those above-described.

If the controller 202 determines that the in-vehicle illuminance is higher than the first threshold, or that the position of the presentation image is not within the predetermined angular range from the gaze direction indicated by the gaze direction information (step S303: NO), the flow proceeds to step S107. On the other hand, if the controller 202 determines that the in-vehicle illuminance is equal to or lower than the first threshold, and that the position of the presentation image is within the predetermined angular range from the gaze direction indicated by the gaze direction information (step S303: YES), the flow proceeds to step S106.

Note that although the flowchart of FIG. 7 has been described with the example of the case where the processing in step S302 is performed between step S301 and step S303, the processing in step S302 may be performed at any timing before step S301.

According to the modification, the luminance and the blue component in the hue of the presentation image can be decreased when the gaze direction of the occupant of the vehicle is out of the central visual field. Therefore, the visibility of the presentation image can be further improved.

(Fourth Modification)

In addition to the information indicating the in-vehicle illuminance, information on the age of the occupant of the vehicle may further be used in the first embodiment. A specific example of this case will be described below.

Figure 8:
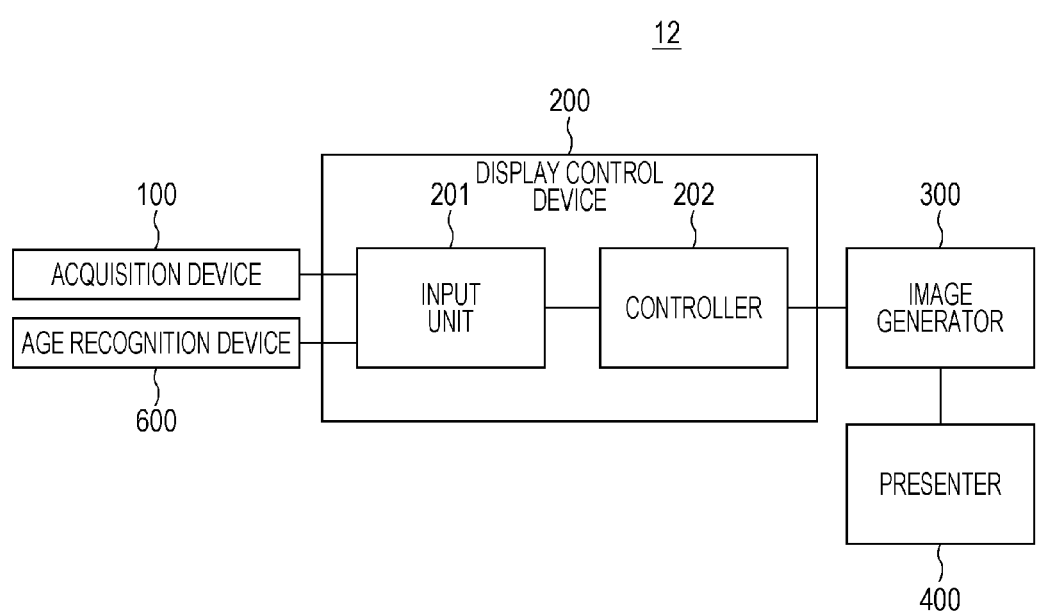
FIG. 8 is a diagram showing a configuration example of a display system according to a fourth modification of the first embodiment of the present disclosure.

First, a configuration example of a display system 12 according to the modification will be described with reference to FIG. 8. FIG. 8 is a block diagram showing the configuration example of the display system 12 according to the modification. Note that, the constituent same with that in FIG. 1 is indicated by the same reference numeral in FIG. 8, and a duplicated description is omitted herein.

As shown in FIG. 8, the display system 12 further includes an age recognition device 600 in addition to the configuration shown in FIG. 1.

The age recognition device 600 recognizes the age of the occupant of the vehicle and outputs the information indicating the recognized age (hereinafter, referred to as age information) to the input unit 201. For example, the age recognition device 600 may recognize the age of the occupant of the vehicle based on a face image of the occupant or ID information of the occupant obtained from an external device (a smartphone or the like, for example).

Additionally, the acquisition device 100 is an illuminance sensor (an example of the first sensor) which is provided inside the vehicle to measure the in-vehicle illuminance, and outputs the information indicating the in-vehicle illuminance as the environmental information to the input unit 201.

The input unit 201 outputs the age information received from the age recognition device 600 and the information indicating the in-vehicle illuminance received from the acquisition device 100 to the controller 202.

The controller 202 determines whether or not the luminance of the presentation image need be decreased based on the age information and the information indicating the in-vehicle illuminance received from the input unit 201. The details of the determination processing will be described with reference to FIG. 9.

Figure 9:
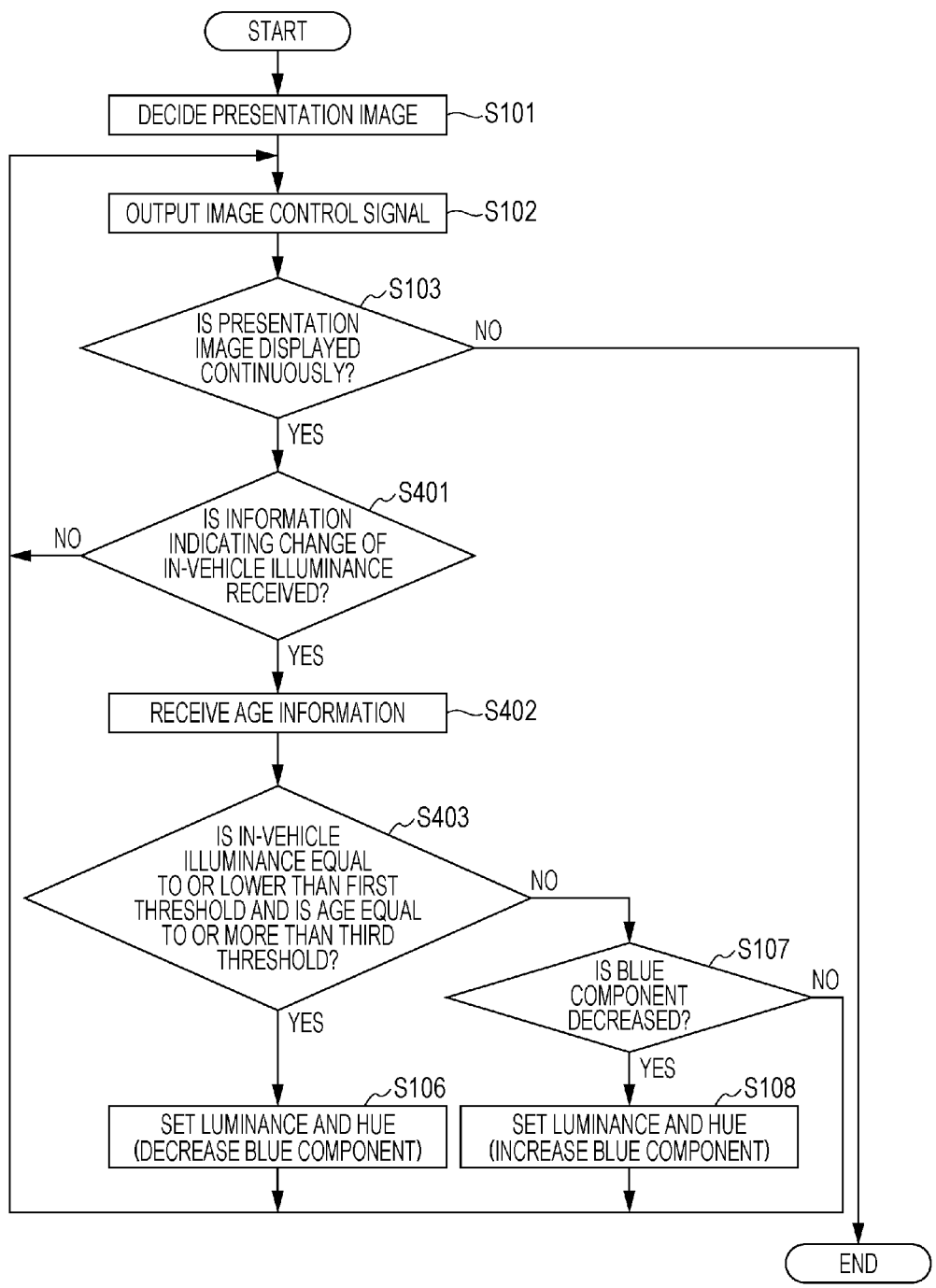
FIG. 9 is a flowchart showing an operation example of a display control device according to the fourth modification of the first embodiment of the present disclosure.

Next, an operation example of the display control device 200 according to the modification will be described with reference to FIG. 9. FIG. 9 is a flowchart showing the operation example of the display control device 200 according to the modification. Note that, the processing same with that in FIG. 2 is indicated by the same reference numeral in FIG. 9, and a duplicated description is omitted herein.

In step S401, the controller 202 determines whether or not the controller 202 receives the information indicating a change (decrease or increase) of the in-vehicle illuminance from the input unit 201.

If the controller 202 determines that the controller 202 receives no information indicating the change of the in-vehicle illuminance (step S401: NO), the flow returns to step S102. On the other hand, if the controller 202 determines that the controller 202 receives the information indicating the change of the in-vehicle illuminance (step S401: YES), the flow proceeds to step S402.

In step S402, the input unit 201 receives the age information from the age recognition device 600 and outputs the age information to the controller 202.

In step S403, the controller 202 determines whether or not the luminance of the presentation image need be decreased from the default luminance based on the environmental information. For example, the controller 202 determines whether or not the in-vehicle illuminance is equal to or lower than the predetermined first threshold and the age indicated by the age recognition is equal to or over a predetermined threshold (an example of a third threshold).

If the controller 202 determines that the in-vehicle illuminance is higher than the first threshold, or that the age is under the third threshold (step S403: NO), the flow proceeds to step S107. On the other hand, if the controller 202 determines that the in-vehicle illuminance is equal to or lower than the first threshold, and that the age is equal to or over the third threshold (step S403: YES), the flow proceeds to step S106.

Note that although the flowchart of FIG. 9 has been described with the example of the case where the processing in step S402 is performed between step S401 and step S403, the processing in step S402 may be performed at any timing before step S401.

Some elder people have greater difficulty in visually recognizing the presentation image than young people. According to the modification, when the occupant of the vehicle is an elder person, since the luminance and the blue component in the hue of the presentation image can be decreased, the visibility of the presentation image can be improved. On the other hand, the luminance and the blue component in the hue of the presentation image are not decreased when the occupant of the vehicle is a young person. Therefore, the young occupant may not be visually annoyed with switching of the presentation image.

(Fifth Modification)

In addition to the information indicating the in-vehicle illuminance, information on a content of the presentation image may further be used in the first embodiment. A specific example of this case will be described below.

The description of the configuration of the modification is omitted since the configuration is the same with the configuration shown in FIG. 1.

Figure 10:
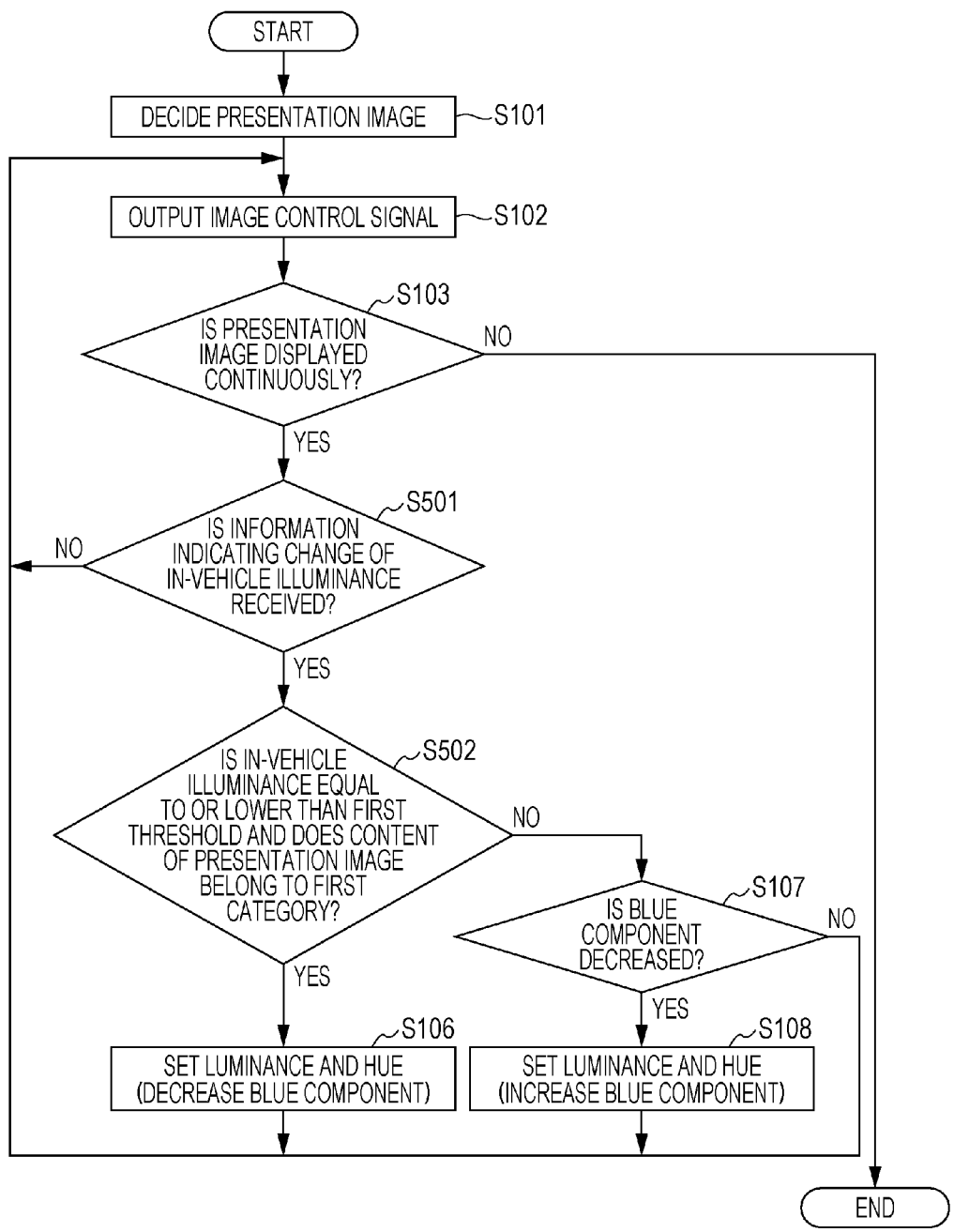
FIG. 10 is a flowchart showing an operation example of a display control device according to a fifth modification of the first embodiment of the present disclosure.

Next, an operation example of the display control device 200 according to the modification will be described with reference to FIG. 10. FIG. 10 is a flowchart showing the operation example of the display control device 200 according to the modification. Note that, the processing same with that in FIG. 2 is indicated by the same reference numeral in FIG. 10, and a duplicated description is omitted herein.

In step S501, the controller 202 determines whether or not the controller 202 receives the information indicating a change (decrease or increase) of the in-vehicle illuminance from the input unit 201.

If the controller 202 determines that the controller 202 receives no information indicating a change of the in-vehicle illuminance (step S501: NO), the flow returns to step S102. On the other hand, if the controller 202 determines that the controller 202 receives the information indicating the change of the in-vehicle illuminance (step S501: YES), the flow proceeds to step S502.

In step S502, the controller 202 determines whether or not the luminance of the presentation image need be decreased from the default luminance based on the environmental information. For example, the controller 202 determines whether or not the in-vehicle illuminance is equal to or lower than the predetermined first threshold and the content of the presentation image belongs to a first category (details will be described later).

Here, specific examples of the content of the presentation image will be described. In the modification, the presentation image is categorized in either of the first category or a second category depending on the content.

The first category includes contents that assist the occupant to drive the vehicle (an example of control of the moving object). For example, the contents of the first category are a speed of the vehicle, a remaining amount of a fuel of the vehicle, a traveling distance of the vehicle, a current position of the vehicle, a distance from the current position to a destination, a state of the driver (sleepiness level, for example), weather, a current traffic jam, a current accident, a current regulation, a vacancy of a parking space, a speed limit of each road section or a route, the type or name of an object (for example, another vehicle, a pedestrian, a facility, a building, a traffic light, a road sign, and so on) around the vehicle, a distance between the vehicle and the object, a positional relation between the vehicle and the object, and so on. The contents of the first category may be contents used in an advanced driving assistant system (ADAS) or contents used in a navigation system.

On the other hand, the second category includes contents that do not assist the occupant to drive the vehicle. For example, the contents of the second category are the name of a radio station or a TV program that the occupant is listening to or watching in the vehicle, a content that is being played in the vehicle (the name of an artist or the title of a music number), a receiving state of a message of a service such as an e-mail or a social networking service (SNS) in the vehicle, and so on.

As described in the first embodiment, the presentation image has default setting for the hue, the size, the shape, the display position, and the like. In the modification, the content of the presentation image is additionally set. Therefore, the controller 202 can recognize the content of the presentation image when deciding the presentation image in step S101.

So far, the specific examples of the contents of the presentation image have been described. Hereinafter, the description returns to the flowchart in FIG. 10.

If the controller 202 determines that the in-vehicle illuminance is higher than the first threshold, or that the content of the presentation image does not belong to the first category (step S502: NO), the flow proceeds to step S107. On the other hand, if the controller 202 determines that the in-vehicle illuminance is equal to or lower than the first threshold, and that the content of the presentation image belongs to the first category (step S502: YES), the flow proceeds to step S106.

According to the modification, the luminance and the blue component in the hue of the presentation image can be decreased when the content of the presentation image is driving assistant information with a high priority. Therefore, the visibility of the presentation image can be further improved. On the other hand, the hue is not controlled when the content of the presentation image is information with a low priority. This eliminates a possibility of switching of the presentation image visually annoying the occupant, and consequently increases a possibility of prevention of an accident or the like.

(Sixth Modification)

Figure 11:
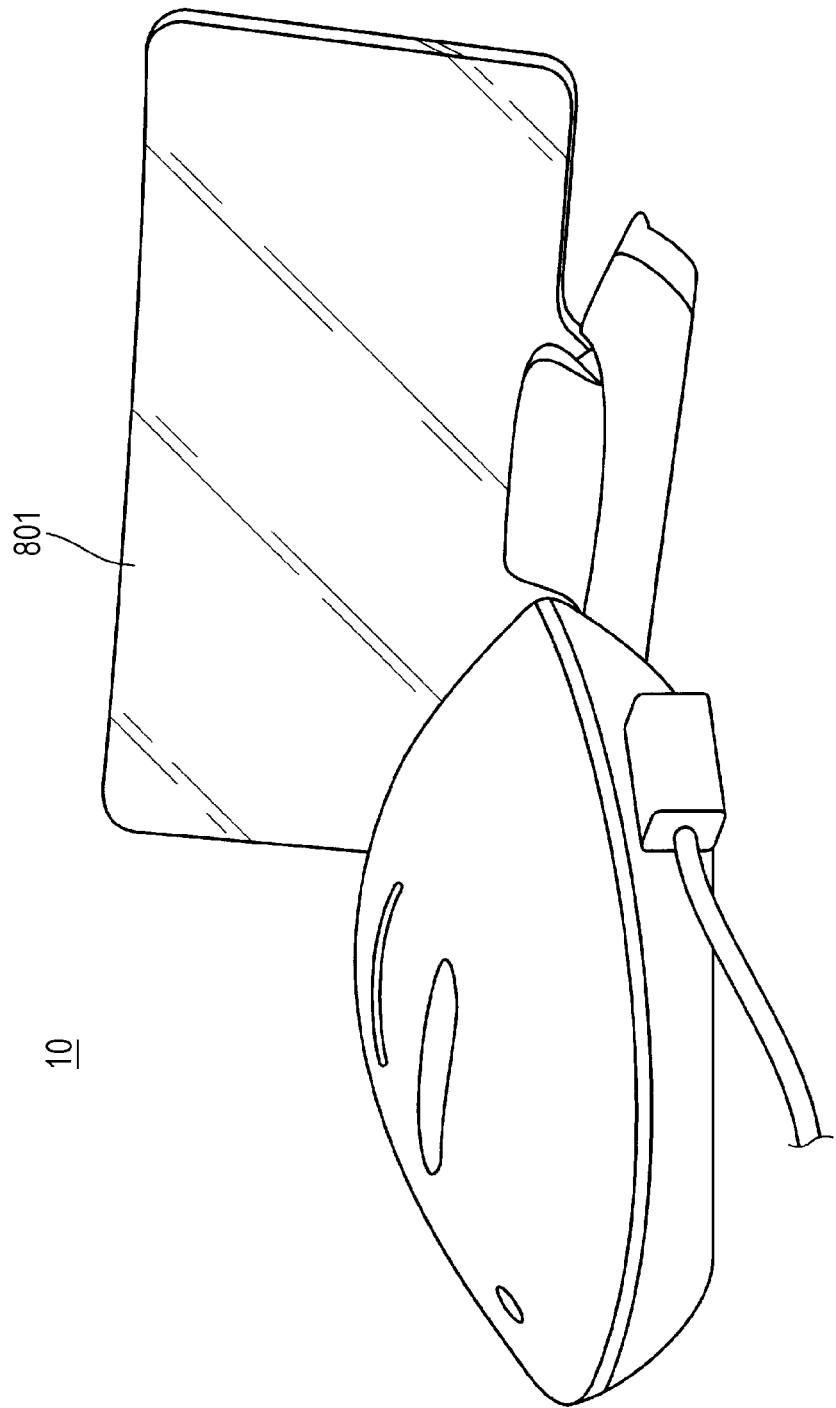
FIG. 11 is a diagram showing an example of a combiner according to a sixth modification of the first embodiment of the present disclosure.

Although the first embodiment has been described with the example of the case where the display system 10 includes the acquisition device 100, the display control device 200, the image generator 300, and the presenter 400, the display system 10 is not limited thereto. For example, the display system 10 may include a display medium in the case where the display medium is the combiner. FIG. 11 is a diagram showing a configuration example of the display system 10 in the case where the display medium is the combiner. As shown in FIG. 11, the display system 10 is provided with the combiner 801 as the display medium. Note that the configuration of the modification may be applied to any of the above-described second to fifth modifications and the later-described second and third embodiments.

(Seventh Modification)

Although the first embodiment has been described with the example of the case where the control of the hue (the control of decreasing or increasing the blue component) and the control of the luminance (the control of decreasing or increasing the luminance) of the presentation image are both performed in step S106 or S108 in FIG. 2, the control of the hue of the presentation image may only be performed.

So far, the modifications of the first embodiment have been described. The above-described modifications may be carried out in any combination as appropriate.

(Second Embodiment)

Figure 12:
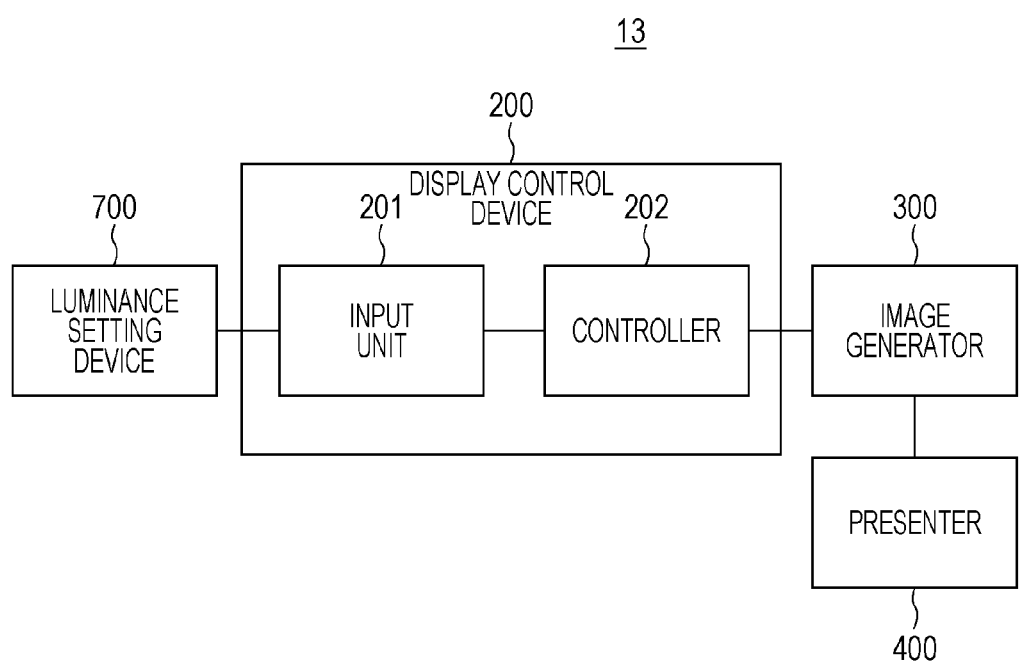
FIG. 12 is a block diagram showing a configuration example of a display system according to a second embodiment of the present disclosure.
Figure 13:
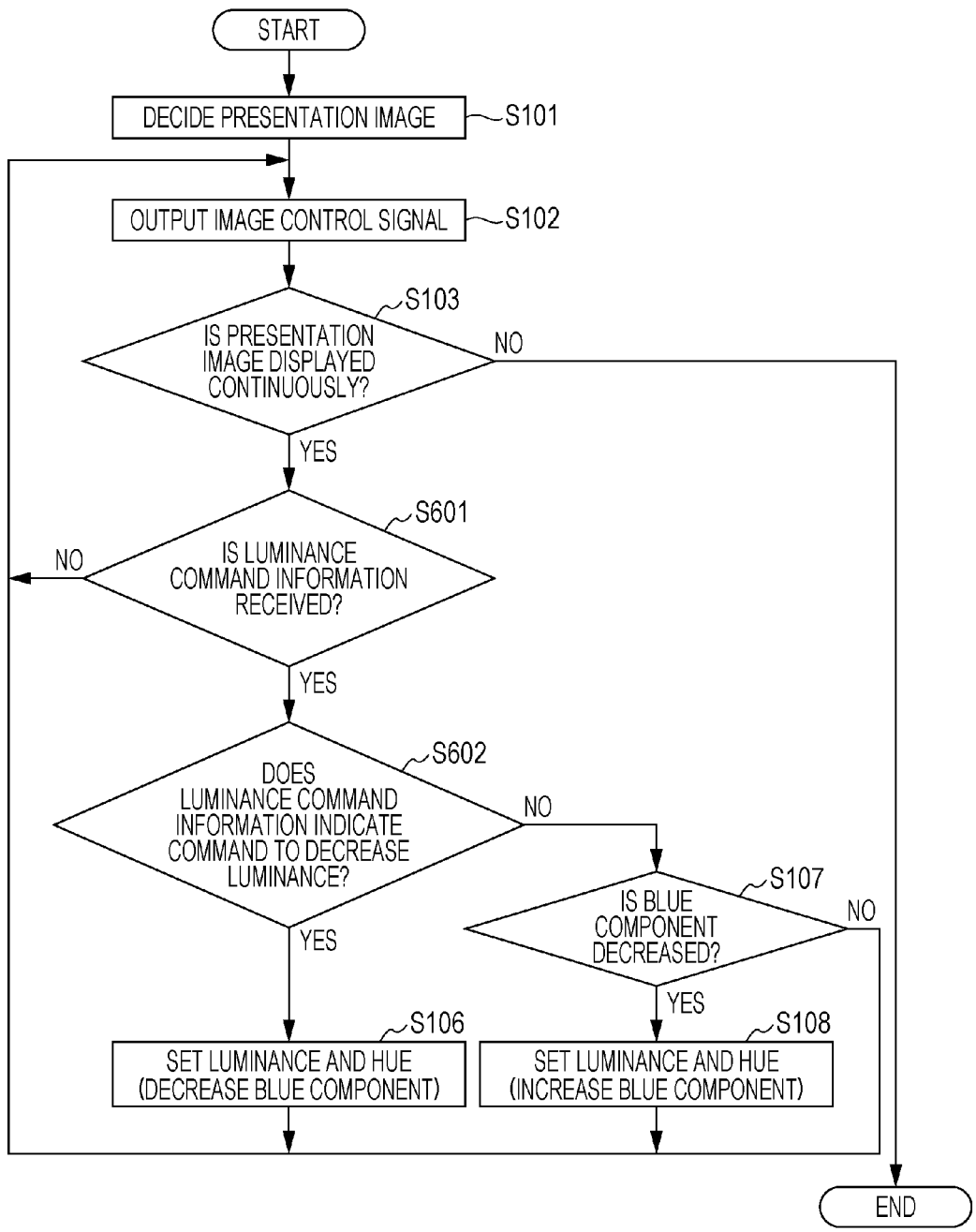
FIG. 13 is a flowchart showing an operation example of a display control device according to the second embodiment of the present disclosure.

A second embodiment of the present disclosure will be described with reference to FIGS. 12 and 13.

First, a configuration example of a display system 13 according to the embodiment will be described. FIG. 12 is a block diagram showing the configuration example of the display system 13 according to the embodiment. FIG. 12 is different from FIG. 1 in that the display system 13 includes a luminance setting device 700 instead of the acquisition device 100. Note that, the constituent same with that in FIG. 1 is indicated by the same reference numeral in FIG. 12, and a duplicated description is omitted herein.

The luminance setting device 700 is a device that receives a command to increase or decrease the luminance of the presentation image. This command may be given by the occupant of the vehicle or by a control device (not illustrated) that controls the entire display system 13, for example.

The luminance setting device 700 outputs information indicating the received command content (hereinafter, referred to as luminance command information) to the input unit 201.

The input unit 201 outputs the luminance command information received from the luminance setting device 700 to the controller 202.

The controller 202 determines whether or not the luminance of the presentation image need be decreased from the default luminance based on the luminance command information received from the input unit 201. The details of the determination processing will be described with reference to FIG. 13.

Next, an operation example of the display control device 200 according to the embodiment will be described with reference to FIG. 13. FIG. 13 is a flowchart showing the operation example of the display control device 200 according to the embodiment. Note that, the processing same with that in FIG. 2 is indicated by the same reference numeral in FIG. 13, and a duplicated description is omitted herein.

In step S601, the controller 202 determines whether or not the controller 202 receives the luminance command information indicating the command to increase or decrease the luminance of the presentation image from the input unit 201.

If the controller 202 determines that the controller 202 receives no luminance command information (step S601: NO), the flow returns to step S102. On the other hand, if the controller 202 determines that the controller 202 receives the luminance command information (step S601: YES), the flow proceeds to step S602.

In step S602, the controller 202 determines whether or not the luminance of the presentation image need be decreased from the default luminance. For example, the controller 202 determines whether or not the luminance command information indicates the command to decrease the luminance.

If the controller 202 determines that the luminance command information does not indicate the command to decrease the luminance (step S602: NO), the flow proceeds to step S107. On the other hand, if the controller 202 determines that the luminance command information indicates the command to decrease the luminance (step S602: YES), the flow proceeds to step S106.

As described above, the display control device 200 in the embodiment includes: the input unit 201 that receives the command information to decrease the luminance of the presentation image to be displayed on the display medium; and the controller 202 that outputs to the image generator 300 the first control signal for generating the first specific image representing the presentation image in a display on the display medium. When the input unit 201 receives the command information, the controller 202 outputs to the image generator 300 the second control signal for generating the second specific image representing the presentation image with the hue changed to decrease the blue component in the display color. As a result, deterioration of the visibility of the presentation image because of the decrease of the luminance of the presentation image can be reduced.

Although the second embodiment in the present disclosure has been described, the present disclosure is not limited to the above second embodiment and can be modified in various ways. For example, any one or combination of the modifications of the first embodiment may be applied to the second embodiment as appropriate.

(Third Embodiment)

Figure 14:
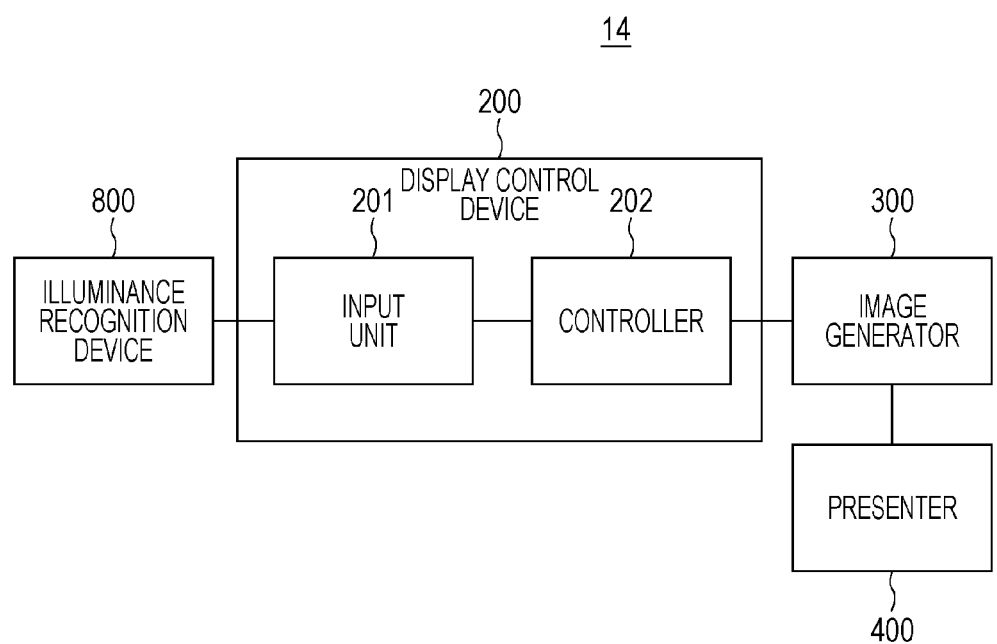
FIG. 14 is a block diagram showing a configuration example of a display system according to a third embodiment of the present disclosure.
Figure 15:
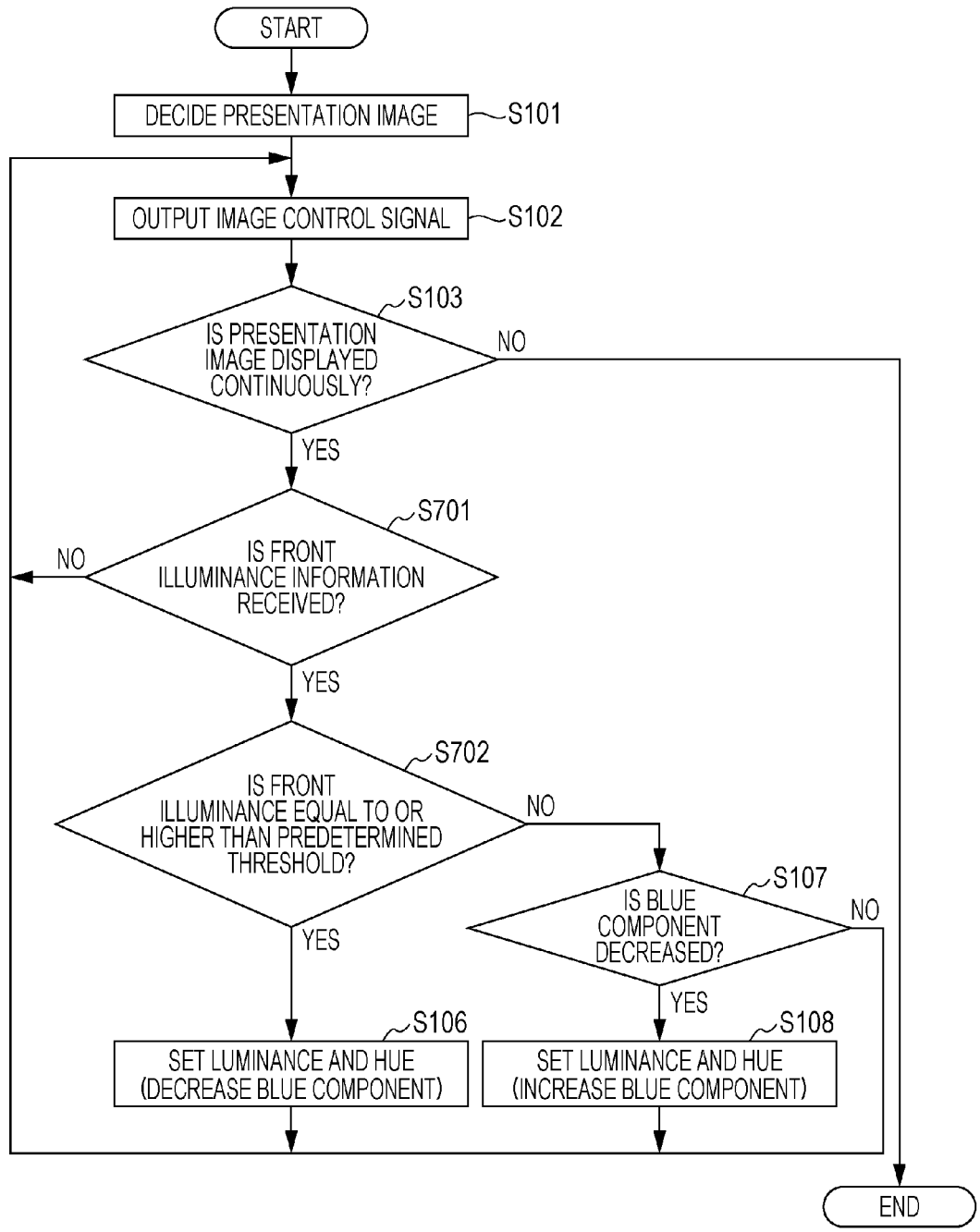
FIG. 15 is a flowchart showing an operation example of a display control device according to the third embodiment of the present disclosure.

A third embodiment of the present disclosure will be described with reference to FIGS. 14 and 15.

First, a configuration example of a display system 14 according to the embodiment will be described. FIG. 14 is a block diagram showing the configuration example of the display system 14 according to the embodiment. FIG. 14 is different from FIG. 1 in that the display system 14 includes an illuminance recognition device 800 instead of the acquisition device 100. Note that, the constituent same with that in FIG. 1 is indicated by the same reference numeral in FIG. 14, and a duplicated description is omitted herein.

The illuminance recognition device 800 is, for example, a sensor that recognizes the front illuminance as described above in the second modification of the first embodiment. The illuminance recognition device 800 outputs the information indicating the front illuminance (hereinafter, referred to as front illuminance information) to the input unit 201. Note that the illuminance recognition device 800 may be a device other than the sensor.

The input unit 201 outputs the front illuminance information received from the illuminance recognition device 800 to the controller 202.

The controller 202 determines whether or not the luminance of the presentation image need be decreased from the default luminance based on the front illuminance information received from the input unit 201. The details of the determination processing will be described with reference to FIG. 15.

Next, an operation example of the display control device 200 according to the embodiment will be described with reference to FIG. 15. FIG. 15 is a flowchart showing the operation example of the display control device 200 according to the embodiment. Note that, the processing same with that in FIG. 2 is indicated by the same reference numeral in FIG. 15, and a duplicated description is omitted herein.

In step S701, the controller 202 determines whether or not the controller 202 receives the front illuminance information from the input unit 201.

If the controller 202 determines that the controller 202 receives no front illuminance information (step S701: NO), the flow returns to step S102. On the other hand, if the controller 202 determines that the controller 202 receives the front illuminance information (step S701: YES), the flow proceeds to step S702.

In step S702, the controller 202 determines whether or not the luminance of the presentation image need be decreased from the default luminance. For example, the controller 202 determines whether or not the front illuminance is equal to or higher than the predetermined threshold.

If the controller 202 determines that the front illuminance is lower than the predetermined threshold (step S702: NO), the flow proceeds to step S107. On the other hand, if the controller 202 determines that the front illuminance is equal to or higher than the predetermined threshold (step S702: YES), the flow proceeds to step S106.

Note that although the embodiment has been described with the example of the case where the condition of decreasing the luminance and the blue component in the hue of the presentation image is that the front illuminance is equal to or higher than the predetermined threshold, the condition is not limited thereto. The in-vehicle illuminance described in the first embodiment may also be used, for example. In this case, the controller 202 may calculate a difference between the in-vehicle illuminance and the front illuminance (hereinafter, referred to as relative illuminance) and may decrease the luminance and the blue component in the hue of the presentation image when the relative illuminance is equal to or higher than a predetermined threshold.

As described above, the display control device 200 in the embodiment includes: the input unit 201 that receives the front illuminance information from the illuminance recognition device 800 recognizing the illuminance of the front of the vehicle; and the controller 202 that outputs to the image generator 300 the first control signal for generating the first specific image representing the presentation image in displaying on the display medium. When the front illuminance is equal to or higher than the predetermined threshold, the controller 202 outputs to the image generator 300 the second control signal for generating the second specific image representing the presentation image with the hue changed to decrease the blue component in the display color. As a result, deterioration of the visibility of the presentation image because of decrease of the luminance of the presentation image can be reduced.

Although the third embodiment in the present disclosure has been described, the present disclosure is not limited to the above third embodiment and can be modified in various ways. For example, any one or combination of the modifications of the first embodiment may be applied to the third embodiment as appropriate.

So far, the embodiments and the modifications of the present disclosure have been described in details. The display systems 10 to 14 and the functions of the units in the display control device 200 in those above-described embodiments and modifications may be carried out in the form of a computer program.

Figure 16:
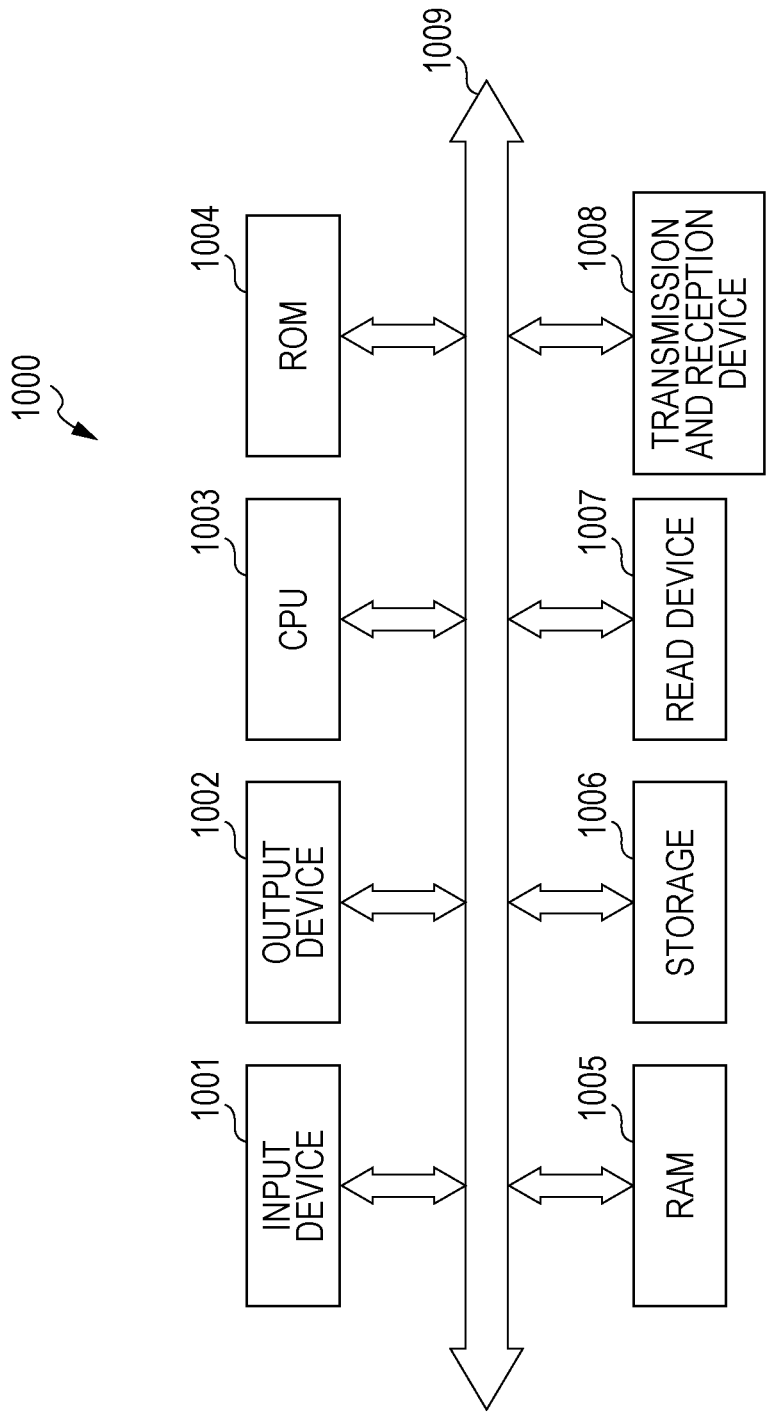
FIG. 16 is a block diagram showing a hardware configuration example of a display system and a display control device according to the embodiments and the modifications of the present disclosure.

FIG. 16 is a diagram showing a hardware configuration of a computer that carries out the functions of the units in accordance with the program. The computer 1000 is provided with an input device 1001 such as input buttons and a touchpad, an output device 1002 such as a display and a speaker, a central processing unit (CPU) 1003, a read only memory (ROM) 1004, and a random access memory (RAM) 1005. Further, the computer 1000 is provided with a storage 1006 such as a hard disk device and a solid state drive (SSD), a read device 1007 that reads information from a storage medium such as a digital versatile disk read only memory (DVD-ROM) and a universal serial bus (USB) memory, and a transmission and reception device 1008 that performs communications through the network. The units shown in FIG. 16 are connected to each other via a bus 1009.

The program for carrying out the functions of the units is stored in the storage medium, and the read device 1007 reads the program from the storage medium and stores the program in the storage 1006. Otherwise, the transmission and reception device 1008 communicates with the server device connected to the network to download the program for carrying out the functions of the units from the server device, and stores the program in the storage 1006.

Then, the CPU 1003 copies the program stored in the storage 1006 to the RAM 1005 and executes instructions included in the program by sequentially loading the instructions from the RAM 1005. Thereby, the functions of the units are carried out. In addition, during execution of the program, the CPU 1003 stores and uses, when necessary, information obtained from the processing described in the embodiments in the RAM 1005 or the storage 1006.

The function blocks used for the descriptions of the above embodiments may be fabricated as a large scale integration (LSI), which is an integrated circuit. Each, part or all of these function blocks may be fabricated as one chip. The integrated circuit fabricated herein is the LSI, but may be an IC, a system LSI, a super LSI, or an ultra LSI depending on a degree of integration.

In addition, the integrated circuit formation technique may be implemented by using a dedicated circuit or a general-purpose processor, instead of the LSI. Moreover, the technique may employ a field programmable gate array (FPGA) that is programmable after LSI fabrication, or a reconfigurable processor in which connections or setting of circuit cells in the LSI are reconfigurable.

Furthermore, if a new integrated circuit formation technique to take the place of the LSI emerges from improvement of the semiconductor technology and its derived techniques, the function blocks may be fabricated as an integrated circuit using this new technique, of course. A bio technology may be considered to be applied.

The present disclosure is useful in a display control device that controls display of information provided to a user (for example, an occupant of a moving object, a user wearing a display device, or the like), a projection device, and a display control program.

What is claimed is:

1. A display control device comprising:
a memory that stores instructions;
a processor that, when executing the instructions stored in the memory, performs operations comprising:
receiving environmental information on a moving object;
outputting, to an image generator, a first control signal for generating a first specific image representing a presentation image to be displayed on a display; and
outputting, to the image generator, a second control signal for generating a second specific image representing the presentation image, the second specific image having a hue in which a blue component is decreased in a display color from the first specific image, wherein
the environmental information is acquired by an acquisition device,
the acquisition device comprises a first sensor that is provided inside the moving object and measures illuminance,
the processor outputs, to the image generator, the second control signal, such that the blue component and luminance of the presentation image are decreased, when the illuminance measured by the first sensor is equal to or lower than a first threshold,
the acquisition device comprises a second sensor that measures illuminance in front of the moving object, and
the processor outputs, to the image generator, the second control signal, such that the blue component and the luminance of the presentation image are decreased, when the illuminance measured by the first sensor is equal to or lower than the first threshold and the illuminance in front of the moving object measured by the second sensor is equal to or lower than a second threshold.

2. A display control device comprising:
a memory that stores instructions;
a processor that, when executing the instructions stored in the memory, performs operations comprising:
receiving environmental information on a moving object;
outputting, to an image generator, a first control signal for generating a first specific image representing a presentation image to be displayed on a display;
outputting, to the image generator, a second control signal for generating a second specific image representing the presentation image, the second specific image having a hue in which a blue component is decreased in a display color from the first specific image, in order to decrease luminance of the presentation image based on the environmental information; and receiving information on a gaze direction of an occupant of the moving object, wherein the processor outputs, to the image generator, the second control signal such that the blue component and the luminance of the presentation image are decreased, when a position of the presentation image on the display is within a predetermined angular range from the gaze direction.

3. A display control device comprising:
a memory that stores instructions;
a processor that, when executing the instructions stored in the memory, performs operations comprising:
receiving environmental information on a moving object;
outputting, to an image generator, a first control signal for generating a first specific image representing a presentation image to be displayed on a display;
outputting, to the image generator, a second control signal for generating a second specific image representing the presentation image, the second specific image having a hue in which a blue component is decreased in a display color from the first specific image, in order to decrease luminance of the presentation image based on the environmental information; and
receiving age information of the occupant of the moving object, wherein
the processor outputs, to the image generator, the second control signal such that the blue component and the luminance of the presentation image are decreased, when an age of the occupant of the moving object is equal to or over a predetermined threshold.

4. The display control device according to claim 3, wherein
the age information is information recognized by an age recognition device, and
the age recognition device recognizes the age of the occupant of the moving object based on a face image of the occupant.

5. The display control device according to claim 3, wherein
the age information is information recognized by an age recognition device, and
the age recognition device recognizes the age of the occupant of the moving object based on ID information on the occupant.

6. A display control device comprising:
a memory that stores instructions;
a processor that, when executing the instructions stored in the memory, performs operations comprising:
receiving environmental information on a moving object;
outputting, to an image generator, a first control signal for generating a first specific image representing a presentation image to be displayed on a display; and
outputting, to the image generator, a second control signal for generating a second specific image representing the presentation image, the second specific image having a hue in which a blue component is decreased in a display color from the first specific image, in order to decrease luminance of the presentation image based on the environmental information, wherein
the processor outputs, to the image generator, the second control signal such that the blue component and the luminance of the presentation image are decreased, when a content presented by the presentation image belongs to a first category out of the first category and a second category that differs from the first category.

7. The display control device according to claim 6, wherein
the first category includes a content that assists control of the moving object.

8. A projection device comprising:
a memory that stores instructions;
a processor that, when executing the instructions stored in the memory, performs operations comprising:
generating a specific image;
outputting the specific image to a display;
receiving environmental information of a moving object from an acquisition device that acquires the environmental information;
outputting a first control signal for generating a first specific image representing a presentation image to be displayed on the display; and
outputting a second control signal for generating a second specific image representing the presentation image, the second specific image having a hue in which a blue component is decreased in a display color from the first specific image, wherein
the acquisition device comprises a first sensor that is provided inside the moving object and measures illuminance,
the processor outputs the second control signal, such that the blue component and luminance of the presentation image are decreased, when the illuminance measured by the first sensor is equal to or lower than a first threshold,
the acquisition device comprises a second sensor that measures illuminance in front of the moving object, and
the processor outputs the second control signal, such that the blue component and the luminance of the presentation image are decreased, when the illuminance measured by the first sensor is equal to or lower than the first threshold and the illuminance in front of the moving object measured by the second sensor is equal to or lower than a second threshold.

9. A non-transitory computer-readable storage medium that stores a display control program to be executed in a display control device in a display system, the display control program causing the display control device to execute processing comprising:
receiving an environmental information from an acquisition device that acquires the environmental information of a moving object;
outputting to an image generator, a first control signal for generating a first specific image representing a presentation image to be displayed on a display,
outputting, to the image generator, a second control signal for generating a second specific image representing the presentation image, the second specific image having a hue in which a blue component is decreased in a display color from the first specific image, wherein
the acquisition device comprises a first sensor that is provided inside the moving object and measures illuminance,
the processor outputs, to the image generator, the second control signal, such that the blue component and luminance of the presentation image are decreased, when the illuminance measured by the first sensor is equal to or lower than a first threshold, the acquisition device comprises a second sensor that measures illuminance in front of the moving object, and the processor outputs, to the image generator, the second control signal, such that the blue component and the luminance of the presentation image are decreased, when the illuminance measured by the first sensor is equal to or lower than the first threshold and the illuminance in front of the moving object measured by the second sensor is equal to or lower than a second threshold.

\* \* \* \* \*